Figure 1:
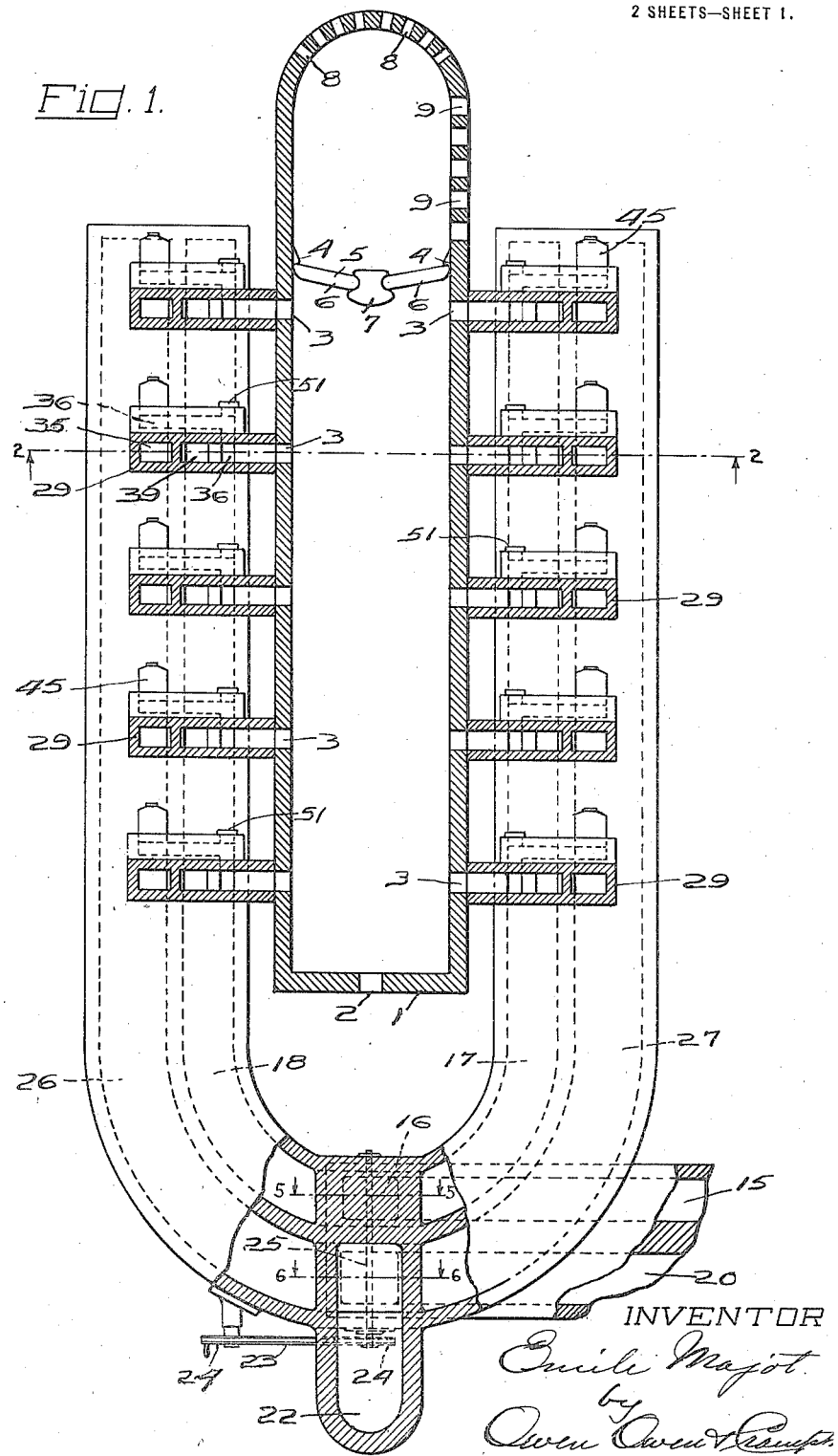

E. MAJOT.
GAS AND AIR MIXER FOR GLASS FURNACES.
APPLICATION FILED AUG. 28, 1917.

1,273,171.

Patented July 23, 1918.
2 SHEETS—SHEET 1.

INVENTOR
Emile Majot
by
Owen Owen & Crump

E. MAJOT.
GAS AND AIR MIXER FOR GLASS FURNACES.
APPLICATION FILED AUG. 28, 1917.
1,273,171.
Patented July 23, 1918.
2 SHEETS—SHEET 2.
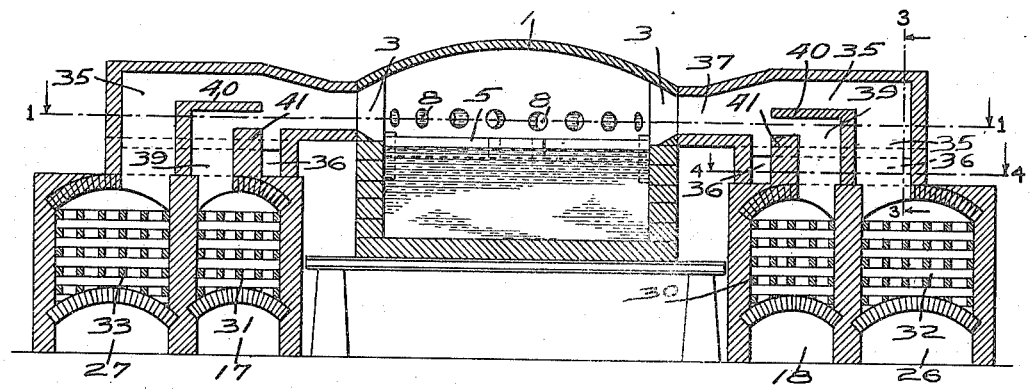
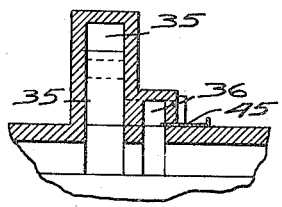
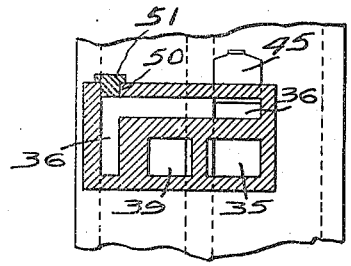
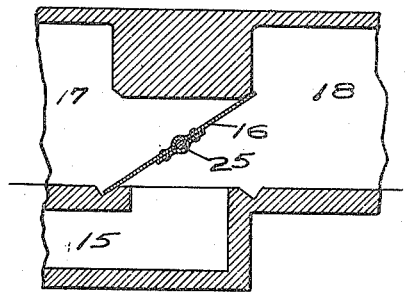
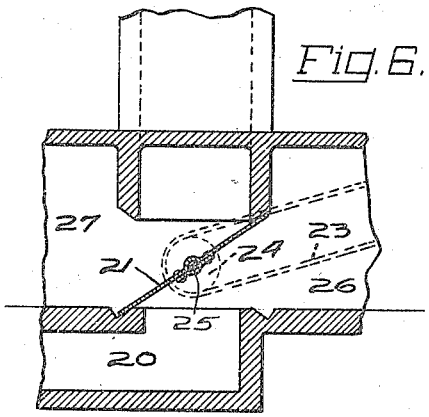
INVENTOR
Emile Majot
by
Owen Owen & Crampton.

UNITED STATES PATENT OFFICE.

EMILE MAJOT, OF MAUMEE, OHIO.

GAS AND AIR MIXER FOR GLASS-FURNACES.

1,273,171.   Specification of Letters Patent.   Patented July 23, 1918.

Application filed August 28, 1917. Serial No. 188,627.

*To all whom it may concern:*

Be it known that I, EMILE MAJOT, a citizen of the United States, and a resident of Maumee, in the county of Lucas and State of Ohio, have invented a certain new and useful Gas and Air Mixer for Glass-Furnaces; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a new and useful improvement in glass furnaces. It particularly relates to means for producing a perfect mixture for melting the ingredients for making glass to insure perfect combustion.

It has for its object the reduction of the coal required for the formation of the gas consumed, also the reduction of the salt cake or the sodium compounds and mixtures forming the flux for glass melting. It also has for its object to reduce the sulfur stains which result in the loss of a higher quality of the glass. It also has for its object the provision of means for collecting dust from the gas.

The invention may be contained in many forms of constructions usable for furnaces, all of which come within the purview of my claims hereinafter appended. To show the practicability of my invention I have selected a glass furnace containing the invention and shall describe it hereinafter. The construction selected is illustrated in the accompanying drawings.

Figure 1 of the drawings is a plan view of the glass furnace showing somewhat diagrammatically the arrangement of the flues and passageways through which the gases pass in the operation of the furnace. Fig. 2 is a sectional view of the furnace illustrated in Fig. 1 taken on the line 2—2. Fig. 3 is a sectional view of the gas passageways taken on the line 3—3 indicated in Fig. 2. Fig. 4 is also a sectional view to show the passageways and which is taken on the line 4—4 indicated in Fig. 2. Figs. 5 and 6 illustrate a form of butterfly valves used in controlling passageways of the furnace. Fig. 5 is a sectional view taken on the line 5—5 indicated in Fig. 1, and Fig. 6 is a sectional view taken on the line 6—6 indicated in Fig. 1.

1, Fig. 1, is the melting furnace having a filling hole 2 into which the mixture of the glass ingredients is inserted. This mixture is gradually melted by the combustion of the gases which pass through the openings 3 into the melting furnace above the surface of the glass. As the glass is melted it passes to the end of the furnace opposite the filling hole 2. The furnace is provided with lugs or flanges 4 which operate to retain a jointed floater 5 for skimming the glass. The jointed floater is of the form well known in the art. It consists of two floater bars 6 of fire-resisting material which are held together by the movement of the glass along the furnace and by the key 7 which operates to lock the ends of the floater bar 6. The movement of the glass tends to spread the ends of the floater bar 6 so that they will engage with the lugs 4. The floater bar 6 and the key 7 float upon the surface of the glass and thus the jointed floater bar 5 keeps back the impurities which form on the surface of the liquid glass. The furnace is also provided with the gathering holes 8 into which the glass blowers insert their pipes for the gathering of the glass upon the ends of their pipes. The furnace is also provided with the blow holes 9 into which the blowers insert the glass in order to properly heat it from time to time, as may be required in the blowing operations.

Arranged around the furnace 1 and in horseshoe shape are flues and passageways for the air and the gas which is consumed in the melting of the glass in the furnace. A gas producer of a suitable form is connected with the passageway 15 which extends to beneath the butterfly valve 16. Passageways 17 and 18 extend to either side of the butterfly valve 16. The butterfly valve 16 operates to switch the communication from the gas producer which is connected to the passageway 15 from one passageway 17 to the other passageway 18, and vice versa, in the operation of the furnace. The gas from the producer is heavily charged with carbon and also contains considerable sulfur which is produced from the coal used in forming the gas. The gas from the producer moreover is heated to a high temperature which operates to heat the passageways through which the gas passes to the furnace.

According to the location of the butterfly valve 16 the gas will pass to the right or to the left of the butterfly valve, that is, through the passageway 17 or through the passageway 18. The air likewise is drawn through the passageway 20 to beneath the butterfly valve 21 by the draft of the chimney which is located above the chamber or passageway 22, as hereinafter more fully described. The butterfly valves 16 and 21 are connected together and may be operated by any suitable means such as the belt 23 and the wheels 24. The butterfly valves are located on the shaft 25 which is connected to a wheel 24 in the form of device for operating the butterfly valve shown in the drawing. The butterfly valves are located in substantially the same plane in the structure shown in the drawing and switch the communication from the passageway beneath in each case to the right or to the left, according to the position of the butterfly valves. The butterfly valve 21 directs the air either into the passageway 26 or to the passageway 27, according to its position, and establishes the draft from the passageway from which the inlet passageway 20 is switched to the passageway 22 leading to the chimney. The chimney thus operates to draw the air through the passageway 20 and also assists in causing movement of the gas through the passageway 15 which leads from the gas producer.

When the butterfly valves 16 and 21 are in the position illustrated in Figs. 5 and 6, the gas will pass through the passageways 15 and 18 and the air will pass through the passageways 20 and 26 to beneath the gas mixers 29 which are located above the passageways 17, 18, 26 and 27. The mixers 29 are located above brick checker-work 30, 31, 32 and 33, which are located in chambers which form a communication between the passageways for the gas from the producer and the passageways for the air.

The mixers 29 are each provided with three passageways which terminate within the mixer and somewhat remote from the outlet of the mixer and the inlet into the furnace. Two of the passageways are for air and communicate with the passageway 26 or 27 through the checker-work 32 or 33, according to which side of the furnace the mixer is located on. One passageway 35 extends from the chamber containing the checker-work to the top of the mixer. Another passageway 36 extends from above the checker-work 32 or 33 and extends to the lower side of the mixing chamber or flue 37 which forms the outlet of the gases from the mixer and which directs the gases through the opening 3 into the glass melting furnace. A passageway is formed for the gas from the gas checker and opens near the lower side of the mixing chamber 37 and so as to pass between the stratas of air which are formed by the air being directed to the top and the bottom of the mixing chamber, and moreover passes over the outlet of the passageway 36 which admits air to the lower side of the mixing chamber 37. The passageway 39 communicates with the passageway 18 or 17 through the checker-work 30 or 31, according to the side of the furnace on which the mixer 29 is located. It is partitioned by the angular wall 40 from the passageway 35 and by the wall 41 from the pasageway 36, so that the openings of the passageways 35 and 37 are in vertical planes, while the opening of the passageway 36 is in a horizontal plane and one side of the opening of the passageway 36 is in close proximity to the opening of the passageway 39, and is moreover directly below the opening of the passageway 39, the planes of the openings of the passageways 39 and 36 being also at right angles to the other. The air from the passageway 36 mixes readily with the gas from the passageway 39, while the upper strata formed by the air coming through the passageway 35 will mix to a certain extent, but will form a strata of air over the top of the furnace which will mix and consume the lighter gases, while the strata of air from the passageway 36 will operate to consume the heavier gases that may be formed in the producer and which pass to the melting furnace through the passageway 39.

A plate 45 may be provided for cutting off the movement of the air from the chamber containing the checker work through the passageway 36. The plate or damper may also be used to vary the amount of air which passes through the passageway 36 into the mixing chamber 37 and below the outlet of the passageway 39.

The gas passing through the passageway 39 and mixed with the air that passes through the passageways 36 and 35, is consumed at the outlet 3 above the surface of the glass in the furnace. The gases passing along the furnace as they are mixed are almost completely consumed, and the sulfur gases that collect in the furnace are almost all reduced and very little unconsumed gas escapes through the gathering holes and the blow holes, which in the ordinary furnaces appear in the form of flames extending from the working holes. This produces a more comfortable working condition for the workers.

The reduced gases pass out through the openings 3 and through the chambers 35, and down through the checker-work 33 to the passageway 27. The gas is then drawn by the butterfly valve 21 and up through the chimney located above the chamber 22. The hot gases leaving the furnace heat the checker-work 33 when the gases are passing from the left to the right of the furnace. The gases are allowed to pass in this direction for a short period of time, preferably for thirty minutes, whereupon the butterfly valves 16 and 21 are turned to connect the passageways 15 and 20 with the passageways 17 and 27, respectively, whereupon the air will first be drawn to the checker-work 33 and will be heated by the bricks which were previously heated by the reduced gas leaving the furnace. The hot air and the gas from the producer then pass into the furnace from left to right, and out through the chamber 35 and down through the brick checker-work 32 and out through the passageway 26, by the valve 21 and up through the chimney. This flow is likewise continued for a short period of time, whereupon the butterfly valves are again turned so as to direct the gases through the furnace in the opposite direction, and again heat the brick checker-work through which the air will subsequently pass and become heated.

The movement of the consumed gases into the mixers 29 and particularly while passing through the passageway 37, causes the dust to collect in advance of the partition walls 40 and 41. This is deposited in the chamber 36 of each mixer 29. The lower end or corner of the passageway 36 may be provided with an opening 50 in which a plug 51 of any suitable fire-resisting material may be inserted to close the opening 50. The dust may be removed through the opening 50. Collecting of the dust in the passageway 36, and particularly that portion of it near the furnace, prevents the dust passing on to the checker-work 30 and 32 through the passageways 35 and 39 so that when the currents of the gases are reversed, the dust is not discharged into the furnace and over the molten glass. This permits the production of pure glass from the furnace.

By my invention I find that the amount of coal for melting the glass is reduced 12½ per cent. By producing a perfect mixture of the gases by means of the arrangement of the passageways described, there is no waste of gas produced in the producer. All of the gas that is produced in the producer is consumed in the furnace. Furthermore the sulfur is greatly reduced and the sulfur stains are not produced on the glass. I have also found that the amount of flux required for the melting of the glass composition is reduced 4 per cent. This is probably due to the more intense heat which is produced at the points of connection of the mixers with the furnace and the composition of all of the gas that is formed by the producer.

I claim:

1. In a glass melting furnace, the combination of a mixer and a heating means, the mixer having two passageways having outlets located in a vertical plane, means for conducting air through the heating means and the upper of the two passageways, and means for conducting producer gas to the lower of the two passageways, the mixer having a third passageway having an outlet located in a horizontal plane and in proximity to the lower of the outlets of the first named passageways, and means for conducting air from the heating means through the third named passageway.

2. In a glass melting furnace, the combination of a mixer and a heating means, the mixer having two passageways having outlets located in a vertical plane, means for conducting air through the heating means and the upper of the two passageways, and means for conducting producer gas to the lower of the two passageways, the mixer having a third passageway having an outlet located in a horizontal plane and in proximity to the lower of the outlets of the first named passageways, means for conducting air from the heating means through the third named passageway, and a shutter for regulating the flow of air through the third named passageway.

3. In a glass melting furnace, two sets of mixers and a heating means, the sets operating alternately for inlets of air and gas and outlets for products of combustion, each mixer having two passageways having outlets located one above the other and in a vertical plane, means for conducting air through the heating means and the upper of the two passageways and means for conducting producer gas to the lower of the two passage-ways, each mixer having a third passage-way having an outlet located below and in proximity to the lower of the outlets of the first named passage-way, the third passage-way of the other set for receiving the dust discharged from the furnace.

4. In a glass melting furnace, two sets of mixers and a heating means, the sets alternately acting as inlets for fuel and air, and outlets for combustion products, each mixer having two passage-ways having outlets located in a vertical plane, means for conducting air through the heating means and the upper of the two passage-ways, and means for conducting producer gas to the lower of the two passage-ways, each mixer having a third passage-way having an outlet located in a horizontal plane in proximity to the lower of the outlets of the first named passage-way, a vertical wall separating said lower and third passage-ways and forming a dust baffle when said passages are conducting combustion products whereby the dust collects on the bottom of said third passage.

5. In a glass melting furnace, two sets of mixers and a heating means, the sets operating alternately for inlets of air and gas and outlets for products of combustion, each mixer having two passage-ways having outlets located one above the other and in a vertical plane, means for conducting air through the heating means and the upper of the two passage-ways and means for conducting producer gas to the lower of the two passage-ways, each mixer having a third passage-way having an outlet located below and in proximity to the lower of the outlets of the first named passage-way, the first and third passage-ways of the other set forming an outlet for the products of combustion, the third passage operating to collect the dust.

In testimony whereof, I have hereunto signed my name to this specification.

EMILE MAJOT.